June 8, 1965  A. R. GOELLNER  3,187,573
LIQUID LEVEL GAUGE
Filed June 27, 1962  2 Sheets-Sheet 1
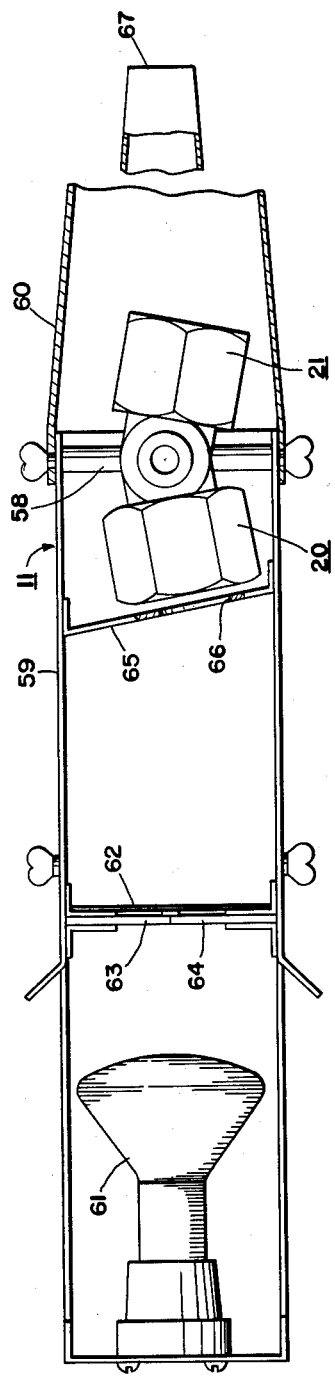
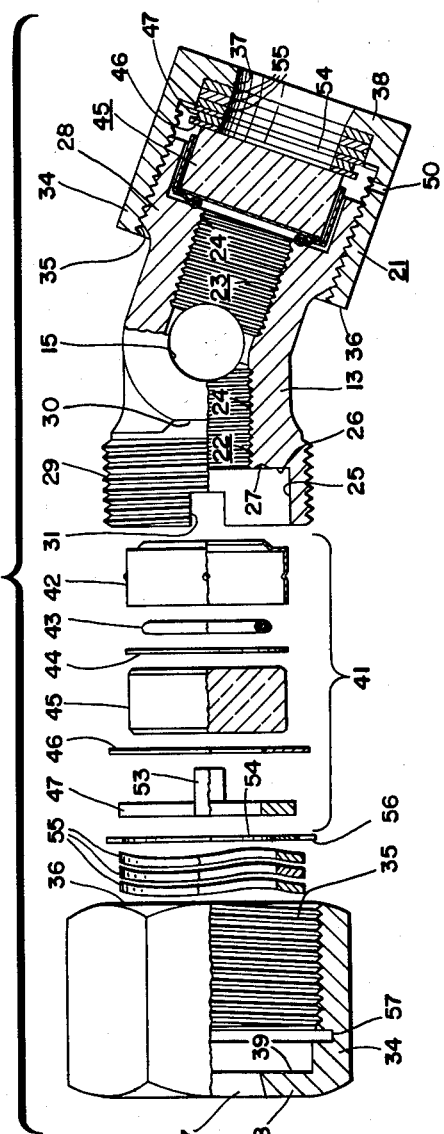
INVENTOR.
ALLAN R. GOELLNER
BY Woodling, Krost,
Granger and Rust
ATTORNEYS INVENTOR.
ALLAN R. GOELLNER
BY Woodling, Krost,
Grange and Rust
ATTORNEYS

United States Patent Office 3,187,573
Patented June 8, 1965

3,187,573
LIQUID LEVEL GAUGE
Allan R. Goellner, Parma Heights, Ohio, assignor, by mesne assignments, to The Clark-Reliance Corp., Cleveland, Ohio, a corporation of Ohio
Filed June 27, 1962, Ser. No. 205,718
15 Claims. (Cl. 73—329)

The invention relates in general to liquid level gauges and, more particularly, to gauges which may be assembled from individual water column bodies wherein individual sub-assemblies are used for each port in the liquid level gauge and wherein only a single threaded connection is provided at each port.

Liquid level gauges with gauge ports have been used in the past wherein a glass or transparent plate or disc has been mounted in position to view the liquid or water level in a water column. These have frequently been used instead of a gauge glass full of liquid or water, whenever the pressure in the liquid vessel becomes too high for such gauge glass to withstand. In such cases, the industry has resorted to such individual transparent ports, for example on high pressure steam boilers. A number of such transparent ports at different levels may be used to better determine the actual liquid level.

The prior art has known such individual transparent ports which are made of a number of separate parts. For example, as many as twelve or fourteen parts may be used, including an outer metal ring held to a body by four or six bolts to tightly compress a glass disc into sealing engagement. These many parts must be individually handled and assembled on the water column or other gauge column. Periodically, cleaning and replacement of these transparent ports is required in order to maintain them clean and free from leakage. In such case the many individual parts which comprises each transparent port must be handled by the mechanic or serviceman disassembling, cleaning and reassembling the gauge. This has many disadvantages, in possible loss or damage to the various parts plus the possibility of dirt or other foreign matter getting between the various parts which may preclude proper assembly. For example, if grit comes between a gasket and the glass disc, then this may crack the glass when the bolts are tightened down. Still further, the use of such transparent ports with a plurality of separate parts either means that one must use a torque wrench to tighten the bolts to a predetermined torque and in criss-cross fashion or else the individual parts must be extremely carefully machined to close tolerances so that the overall possible mismating of tolerances will be within a given range. If not within this range, then the gauge glass may be cracked by too much pressure or else the entire assembly may leak because of too little pressure on the gaskets. Still worse, the glass may have established therein a residual stress which will not crack the glass immediately but will crack it upon repeated heating and cooling when in service.

The prior art has also known such water column made of metal with individual ports thereon with the water column necessarily being a large heavy piece which must be carefully machined with a central vertical bore plus several lateral bores to receive the individual ports. This water column body must be made of non-corrosive material for high temperature service, such as stainless steel, when pressures above about 1,000 p.s.i. are encountered. Such non-corrosive materials are difficult to machine and are expensive in first cost.

Accordingly, an object of the present invention is to provide a liquid level gauge which obviates the above disadvantages.

Another object of the invention is to provide a port sub-assembly of parts with a single threaded connection of a threaded member to the water column body. This permits ready removal, cleaning and replacement of the port assembly without danger or loss of damage to any individual parts.

Another object of the invention is to provide a simple and economical port assembly for use on high pressure liquid gauges.

Another object of the invention is to provide a unitary port assembly which may be used in pairs in a gauge column to allow light passage completely through the gauge column and the two opposite ports, with all ports assemblies being interchangeable.

Another object of the invention is to provide a water column made up of welded together individual water column bodies wherein each water column body may be simply and readily fashioned from non-corrosive material using a minimum of such expensive material, and thus providing a lightweight simple liquid level gauge which readily may be fabricated to any desired length.

Other objects and a fuller understanding of the invention may be had by referring to the following description and claims, taken in conjunction with the accompanying drawings, in which:

FIGURE 1 is a plan view, partly in section, of a gauge embodying the invention;

FIGURE 3 is an enlarged partial sectional and exploded view of a water column body and two port assemblies;

Figure 2:
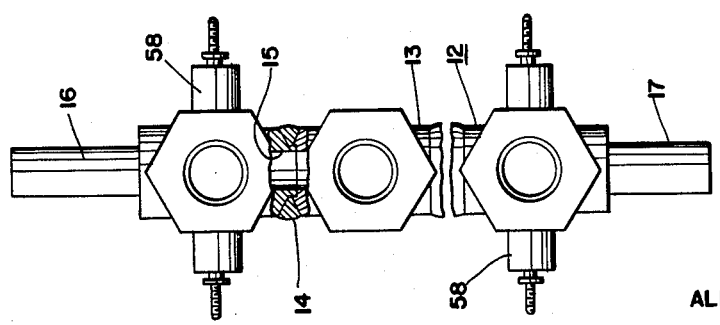
FIGURE 2 is an elevational view of the gauge column removed from the housing.

FIGURE 1 is a plan view of the complete liquid gauge 11 which embodies the invention for purposes of description but not limitation. This gauge 11 includes a gauge column or water column 12 as better shown in FIGURE 2. FIGURE 2 shows this gauge column alone as comprising individual water column bodies 13 welded together at 14 to form the complete water column 12. This water column has a vertical bore 15 with top and bottom connections 16 and 17 which are adapted for connection to a liquid containing device such as a steam boiler to determine the level of liquid therein.

Figure 5:
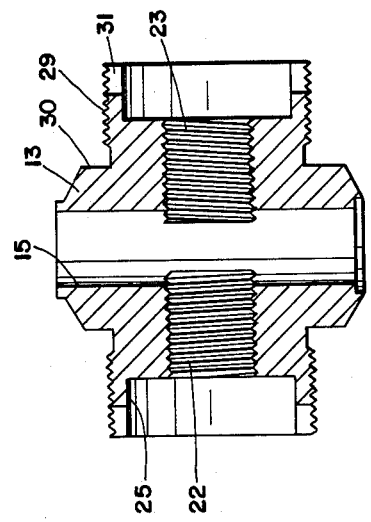
FIGURE 5 is a longitudinal sectional view of one of the water column bodies before assembly.

As seen in FIGURES 1 and 3, the water column 12 includes pairs of opposed port assemblies 20 and 21. First and second lateral bores 22 and 23 are provided in each of the water column bodies 13 and these lateral bores extend to the vertical bore 15 and are disposed at an included angle of approximately 160 degrees. Each lateral bore has a small diameter bore portion 24 adjacent the vertical bore 15 which may be internally threaded or otherwise treated to reduce light reflection. An enlarged bore 25 is provided at the outer end of each of the lateral bores and a recessed internal planar shoulder 26 joins the enlarged bore 25 and the small diameter bore 24. A shallow annular gasket groove 27 may be provided in the planar shoulder 26. The water column bodies 13 are externally threaded at 29 on each projection 28 which contains each of the lateral bores 22 and 23. An external substantially right angle shoulder stop 30 is provided at the inner end of each of the male threads, see FIGURE 5. Two axial recesses 31 are provided substantially 180 degrees apart at the outer end of each water column body.

A port cap nut 34 is provided for each port assembly 20 or 21. Each nut 34 has an internal thread 35 to engage the external thread 29. Each nut has a flat inner end surface 36 adapted to be tightened against the respective shoulder stop 30. A central viewing aperture 37 is provided in the outer end wall 38 of each nut 34. The outer end wall 38 has a substantially flat inner surface 39.

Figure 4:
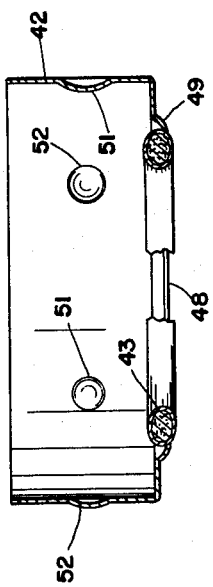
FIGURE 4 is an enlarged view of the gasket and gasket retainer used in the port assembly.

A sub-assembly 41 includes a gasket retainer 42, a gasket 43, a mica disc 44, a pyrex glass disc 45, a cushion washer 46 and a lug washer 47. The gasket retainer 42 is shown enlarged in FIGURE 4 and is made of thin stainless steel or other suitable material and is generally cup-shaped with a central aperture 48. This central aperture is closely dimensioned to engage the outer annular edge of the gasket 43. As shown in this FIGURE 4, the gasket extends above and below the lowermost lip 49 of the gasket retainer 42 so that only the gasket engages and seals between the water column body 13 and the mica disc 44. The gasket 43 engages groove 27 of the recessed planar shoulder 26. This gasket 43 may be of any material suitable to seal the liquid at the temperature and pressure desired. This liquid level gauge 11 is designed for operation on steam boilers at 3,000 p.s.i. at which the temperature is about 700 degrees F. At this temperature and pressure, water is sufficiently corrosive to dissolve ordinary glass within a day or two. Accordingly, it has been found that a single rolled Monel sheath surrounding an internal core of asbestos is satisfactory for this gasket 43. The gasket retainer 42 is provided with three equally spaced internal dimples 51 which center and frictionally retain the glass disc 45. Three symmetrically spaced external dimples 52 are also provided on the gasket retainer 42 to center and frictionally retain the gasket retainer 42 in the enlarged bore 25. The mica disc 44 is relatively thin in the order of .010 to .020", and is used to protect the pyrex glass disc 45 from the corrosive effects of the hot water and steam. The cushion washer 46 may be made from any suitable material such as asbestos, however, annealed copper has been found to be preferable since it flows slightly or coins under pressure to evenly distribute the pressure around the periphery of the glass disc 45. Both surfaces of this cushion washer 46 are treated with a pressure sensitive adhesive to secure this cushion washer 46 to the glass disc 45 and to the lug washer 47. This lug washer may be of non-critical material such as steel, since it is not exposed to the water or steam. This lug washer has two down-turned lugs 53 spaced approximately 180 degrees apart to engage in the axial recesses 31 to prevent turning of this lug washer 47 relative to the water column body 13. The lug washer 53 may be thick enough to evenly distribute forces exerted by wavy spring washers 55, shown as having a three point bearing on each side of the stack, which are disposed between the lug washer 47 and the inner surface 39 of the nut 34. A spring retainer 54 of thin elastic metal is washer shaped with plural radial fingers 56 to lightly engage a recessed groove 57 in the cap nut 34 to retain the spring washers 55 therein.

With the port assembly 21 in place, the cap nut 34 is tightened down against the shoulder stop 30. In so doing, the various parts of the sub-assembly 41 are so dimensioned that the wavy washers 55 are compressed and slightly flattened and this force is transmitted to compress the gasket 43 and, hence, relatively seal the gasket 43 to the mica disc 44 and to the recessed shoulder 26. This port assembly 20 or 21 thus means that a seal is effected at only one place and is accomplished by only a single thread means between the threaded member or nut 34 and the body 13. A single wavy washer 55 may be used, if desired, but three have been shown as disposed in parallel to achieve a large compressional force on the gasket, e.g. in excess of 3,500 p.s.i., and also to achieve a large deflection during compression, e.g. .025 to .030 inch. The three wavy washers 55 may be tack welded at one place along the periphery, to insure that the individual washers do not rotate out of phase alignment. If the individual washers were disposed completely out of phase, they would then be disposed in series, rather than parallel, for three times greater amount of deflection but with no greater deflectional force requirement. The parallel disposition shown provides a deflectional force three times as great as a single spring washer, but with no greater amount of deflection.

A vent hole 50 may be provided in each cap nut 34 to better localize the direction of any escaping steam, in the event of a gasket leak. This helps determine which port of many in a complete water column 12 may be leaking.

The FIGURES 1 and 2 show that the entire water column 12 includes studs 58 to which may be secured a rear housing 59 and a front housing 60. These housings may be of sheet metal and the rear housing 59 includes a bank of reflector bulbs 61, preferably one for each water column body 13. A filter holder 62 is carried in the rear housing 59 and carries a green glass strip 63 and a red glass strip 64. A light shield 65 is also carried in the rear housing and includes an aperture 66 positioned in alignment with each port assembly 20. In this manner, a light source is provided which horizontally shines through the two opposite port assemblies 20 and 21. This light source is affected by the green and red filters 63 and 64 so that green and red horizontally adjacent light beams are directed at the port assembly 20. The front housing 60 narrows to a narrow opening 67 for proper viewing angle. When water is in any one of the water column bodies 13, then the index of refraction of the water is such that the light rays are bent such that a green light is visible through the two opposite port assemblies 21 and 22 and through the narrow opening 67. When the water column body 13 is full of steam, then the index of refraction is changed such that a red light is visible. The entire water column may be made up of any desired number of water column bodies 13 depending upon the degree of gradation desired, for example, from five to nine pairs of port assemblies may be used. In this manner, with the water column partly full of water and partly full of steam, the port assemblies above the water level will show a red light and the port assemblies below the water level will show a green light. Thus, a viewer may readily determine the water level in the water column 12.

Figure 6:
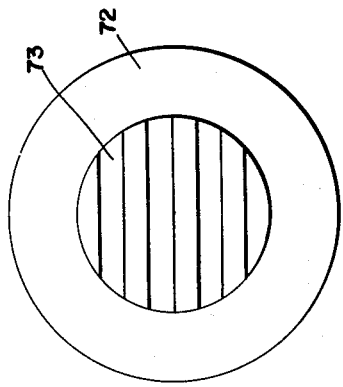
FIGURE 6 is an elevational view of a modified form of glass disc usable in the port assembly; and, FIGURE 7 is a sectional view of a modified port assembly using the glass disc of FIGURE 6.
Figure 7:
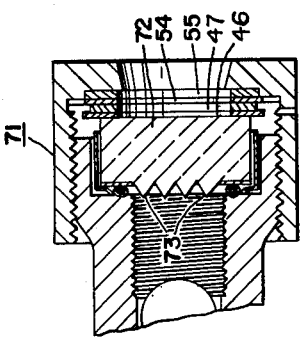

The FIGURES 6 and 7 show a modified port assembly 71 similar to the port assembly 21 by utilizing a reflex glass disc 72. In this port assembly 71, no mica disc is used on the liquid side of the glass disc 72 because of glass prisms 73 which form a part of the glass disc and are disposed in a circular area facing the liquid as seen in FIGURE 7. Since the mica disc is not used to protect the glass, the temperature at which this port assembly 71 may be used is more limited than that for the port assembly 21. For example, this port assembly 71 may be used up to 350 p.s.i. on steam service.

In use, the port assembly 71 may be threaded onto a water column body 13, however, it is not necessary to have a water column body with opposing lateral bores. The principle of this reflex port assembly 71 is that when light enters the glass disc from the front, it is reflected back to the viewer's eyes if steam is present behind the glass and, thus, silvery or white appearance is achieved. However, if water is present against the rear of the prisms 73, then the index of refraction is changed such that light entering the front of the disc is not reflected back to the viewer's eyes and, consequently, the glass disc appears black or dark. Thus, a viewer may distinguish between the presence of water or steam behind the glass disc 72. Other liquids besides water, and their associated gases, also provide the proper index of refraction to establish these two different degrees of lightness and darkness.

The water column 12 may be readily and simply manufactured by welding together individual water column bodies 13. Each individual water column body is readily manufactured in mass production and may be made from a stainless steel forging, for example. As seen in FIG- URE 3, the water column body is small and lightweight with no excess wall thicknesses other than that needed for actual strength to resist the working pressure of up to 3,000 p.s.i. The central vertical bore 15 may easily be drilled as well as the lateral bores 22 and 23 may also be drilled and threaded. These water column bodies 13 may readily be stacked together in any desired length, such as five to nine bodies, to make a water column. The bodies may be placed in a simple jig for alignment and welded together. Thus, manufacturing the complete water column 12 in this manner saves expensive material, reduces inventory, permits greater mass production manufacuring techniques, and makes a lightweight, simple and reliable water column. If the entire water column 12 were to be fabricated from a single piece of bar stock, for example, it would have to be a large, heavy piece of material which is quite expensive per pound and would weigh about five times as much; hence, the present manufacturing technique saves about 80% of the weight of this water column 12 which would otherwise be wasted material. Additionally, such heavy unitary bar stock would have to be drilled lengthwise with a long drill in stainless steel or like material which is hard to machine, and hence, hard to maintain concentricity of such a long bore relative to the outside dimension. The sub-assembly 41 of six different parts greatly aids the quick and proper assembly of the various parts. The gasket retainer 42 holds in place the gasket 43, mica disc 44 and glass disc 45. The internal dimples 51 center and frictionally hold the glass disc 45 which, thus, holds the gasket 43 and mica disc 44 in place. The pressure sensitive material on both sides of the cushion washer 46 means that the cushion washer 46 is retained on the glass disc 45 and also retains the lug washer 47 as a part of this sub-assembly 41. Thus, this sub-assembly is simply placed in the enlarged bore 25 during assembly of the entire unit and the frictional engagement of the external dimples 52 centers and frictionally retains this sub-assembly in the water column body 13. The wavy spring washers 55 are retained in the cap nut 34 by the spring retainer 54, which may simply be pushed into place to engage the groove 57. The cap nut 34 may then be readily threaded onto the water column body 13.

Periodically, cleaning and replacement of parts of the port assembly are needed in order to keep the port clear and free from cloudiness. The present invention provides a port assembly which is exceedingly easy to assemble and disassemble for cleaning or replacement of parts.

The cap nut 34 may be tightened against the shoulder stop 30 each time the port assembly 20 is assembled. This provides a positive stop to establish a definite degree of compression of the wavy washers 55. It has been found not difficult to maintain the manufacturing tolerances on the various parts so that the gasket 43 will be compressed within a satisfactory range. This compression must be enough to seal between the gasket 43 and mica disc 44 and between the gasket 43 and recessed shoulder 26, but must not be enough to crack or unduly strain the glass disc 45 or mica disc 44. If the mica disc 44 becomes cracked, it no longer is impervious to the water or steam and gradually becomes clouded. The present invention has been found to provide a superior seal because sealing is effected in only one place. Still further, the single thread between the cap nut 34 and the water column 13 establishes that the wavy washers 55 are symmetrically compressed around the periphery thereof, and the lug washer distributes the stress to establish uniform stress on the glass disc 45. In prior art assemblies with individual bolts such as four or six bolts being utilized to provide the sealing stress, it was altogether too easy to obtain too little or too much stress or uneven stress which cracked or strained the transparent window and, thus, resulted in premature failure.

The lugs 53 on the lug washer 47 prevent rotation thereof relative to the water column body 13. Rotation could otherwise be imparted to this washer 47 by the turning of the nut 34. This lug washer 47 thus prevents rotation of each of the parts on the inboard side of this lug washer 47 and of primary importance is the prevention of rotation of the mica disc relative to the gasket 43 and prevention of rotation of this gasket relative to the recessed shoulder 26. This is the area of sealing and rotation could provide a grinding action which would damage the mica disc 44.

The use of the individual bodies 13 welded together as at 14 is considerably superior to one large forging or bar stock machined to produce the entire water column 12. There are many advantages including the fact that each of the water column bodies 13 are alike, hence, faster repetitive machining techniques can be employed to produce each such body. The axial hole in each body 13 which provides the vertical bore 15 in the complete water column 12 is a relatively short length relative to its diameter in each body. Thus, this axial hole can be drilled faster and with less lead-out using a stubby drill for short lengths, than is possible using a long drill. A long slender drill would be required if the entire vertical bore 15 were drilled in a water column made from a single piece of metal. It is difficult to drill a long slender hole accurately and also the machining time would be considerably longer because the drilling feed rate would have to be considerably less than with a short stubby drill.

The use of the individual water column bodies which are later welded together means that inventory at the manufacturer can be kept to a minimum. The machined segments or bodies 13 can be quickly welded together to make a gauge or water column of the required length and spacing between windows as per the customer specifications. Accordingly, various ported gauge lengths and sizes need not be stocked by the manufacturer. The individual bodies are more easily handled in a machine tool and the port bosses can be more easily machined on individual bodies than would be the case if a single forging having multiple port bosses had to be machined. Moreover, because of the close spacing between the ports or projections 28, special expensive tools, e.g. small diameter threading dies, would have to be purchased and employed. In the usual type of collapsible die heads used on machine tools, the outside diameter of such die head is many times the maximum diameter of the workpiece which can be threaded. Such collapsible die heads can readily be used on the individual water column bodies 13 but could not be used if a unitary forging were used for the entire water column 12 because it will be noted in FIGURE 2, especially, that the distance between adjacent port cap nuts is considerably less than the transverse diameter of each port cap nut 34.

The individual water bodies 13 have another advantage of being capable of being cut out and replaced by the manufacturer. For example, if a particular gasket seat became severely damaged, as cut by steam for example, due to unnoticed leakage, the defective water column body 13 can be cut out of the water column 12 and a new unit welded in place. This procedure is virtually impossible, and certainly uneconomical, where faulty seats develop in a unitary water column.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A liquid gauge column comprising, in combination, a plurality of bodies each having a central bore,
   a lateral projection on each said body,
   a lateral bore extending to said central bore in each said lateral projection,
   a gasket disposed in each said lateral bore, a transparent window disposed against said gasket,
a male thread on each said lateral projection,
a threaded member having a female thread to engage said male thread,
means acting between said gauge column and said transparent window to prevent relative rotation therebetween,
wavy washer spring means disposed between said threaded member and each said body,
said plurality of bodies being disposed with said central bores in substantially coaxial alignment and with said lateral projections substantially parallel and in a single plane,
and weld metal joining said bodies together to form a complete liquid gauge column with said threaded members having a spacing therebetween less than the transverse dimension of each threaded member.

2. A liquid gauge column comprising, in combination, a plurality of bodies each having a central bore,
a lateral projection on each said body,
a lateral bore extending to said central bore in each said lateral projection,
each said lateral bore having an outwardly facing internal shoulder and an enlarged bore at the outer end thereof,
a sub-assembly for each said enlarged bore including, a gasket disposed adjacent said shoulder,
a transparent window disposed against said gasket,
means retaining together said gasket and transparent window,
a male thread on the outer end of each said lateral projection,
a threaded member having a female thread to engage said male thread,
means acting between said gauge column and said transparent window to prevent relative rotation therebetween,
wavy washer spring means disposed between said threaded member and each said body,
said plurality of bodies being disposed with said central bores in substantially coaxial alignment and with said lateral projections substantially parallel and in a single plane,
and weld metal joining said bodies together to form a complete liquid gauge column with said threaded members having a spacing therebetween less than the transverse dimension of each threaded member.

3. A water gauge comprising, in combination, a water column having a central bore,
a lateral bore extending to said central bore,
said lateral bore having an internal shoulder,
a sub-assembly including, a gasket disposed adjacent said shoulder,
transparent disc means disposed against said gasket,
cushion washer means disposed against the outer face of said transparent disc means,
means retaining together as a sub-assembly said gasket, transparent disc means and cushion washer means,
a stop on said water column,
a threaded member having a central viewing aperture and an outer end wall,
spring means disposed between said cushion washer means and the outer end wall of said threaded member, means retaining said spring means in said threaded member,
single thread means acting between said threaded member and said water column,
and said threaded member in engaging said stop compressing said spring means to compress said gasket and relatively seal said transparent disc means to said water column.

4. A water gauge comprising, in combination, a water column having a central bore,
a lateral bore extending to said central bore,
said lateral bore having an internal shoulder,
a gasket disposed adjacent said shoulder,
transparent disc means disposed against said gasket,
cushion washer means disposed against the outer face of said transparent disc means,
a shoulder stop on said water column,
a threaded member having a central viewing aperture and an outer end wall,
means acting between said water column and said transparent disc means to prevent relative rotation therebetween,
a wavy washer disposed between said cushion washer means and the outer end wall of said threaded member,
single thread means acting between said threaded member and said water column,
and said threaded member in engaging said shoulder stop compressing said wavy washer to compress said gasket and relatively seal said transparent disc means to said water column.

5. A water gauge comprising, in combination, a water-column having a central bore,
a lateral bore extending to said central bore,
said lateral bore having an internal shoulder,
a sub-assembly including, a gasket disposed adjacent said shoulder,
transparent disc means disposed against said gasket,
cushion washer means disposed against the outer face of said transparent disc means,
means retaining together as a sub-assembly said gasket, transparent disc means and cushion washer means,
a shoulder stop on said water column,
a threaded member having a central viewing aperture and an outer end wall,
means acting between said water column and said transparent disc means to prevent relative rotation therebetween,
a spring washer disposed between said cushion washer means and the outer end wall of said threaded member,
means retaining said spring washer relative to said threaded member,
single thread means acting between said threaded member and said water column,
and said threaded member in engaging said shoulder stop compressing said spring washer to compress said gasket and relatively seal said transparent disc means to said water column.

6. A water gauge comprising, in combination, a water column having a central bore,
a lateral bore extending to said central bore,
said lateral bore having an internal shoulder and an enlarged bore at the outer end thereof,
a sub-assembly including, a gasket disposed adjacent said shoulder,
a mica disc disposed against said gasket,
a glass disc disposed against said mica disc,
cushion washer means disposed against the outer face of said glass disc,
means retaining together as a sub-assembly said gasket, mica disc, glass disc and cushion washer means and substantially centering said sub-assembly in said enlarged bore,
a shoulder stop on said water column,
a threaded member having a central viewing aperture and an outer end wall,
means acting between said water column and said mica disc to prevent relative rotation therebetween,
a spring washer disposed between said cushion washer means and the outer end wall of said threaded member,
single thread means acting between said threaded member and said water column,
and said threaded member in engaging said shoulder stop compressing said spring washer to compress said gasket and relatively seal said mica disc to said water column.

7. A water gauge comprising, in combination, a water column having a central bore,
a lateral bore extending to said central bore,
said lateral bore having an outwardly facing recessed internal shoulder and an enlarged bore at the outer end thereof,
a sub-assembly including, a gasket disposed adjacent said shoulder,
a mica disc disposed against said gasket,
a glass disc disposed against said mica disc,
cushion washer means disposed against the outer face of said glass disc,
means including gasket retainer means retaining together as a subassembly said gasket, mica disc, glass disc and cushion washer means and substantially centering said sub-assembly in said enlarged bore,
lug means acting between said water column and said cushion washer means to prevent relative rotation therebetween,
a shoulder stop on said water column,
a threaded member having a central viewing aperture and an outer end wall,
a wavy washer disposed between said cushion washer means and the outer end wall of said threaded member,
means retaining said wavy washer adjacent said outer end wall of said threaded member,
single thread means acting between said threaded member and said water column,
and said threaded member in engaging said shoulder stop compressing said wavy washer to compress said gasket and relatively seal said mica disc to said water column.

8. A water gauge comprising, in combination, a water column having a central bore,
a lateral bore extending to said central bore,
said lateral bore having an outwardly facing recessed internal shoulder and an enlarged bore at the outer end thereof,
a sub-assembly including, a gasket disposed adjacent said shoulder,
a mica disc disposed against said gasket,
a glass disc disposed against said mica disc,
a cushion washer disposed against the outer face of said glass disc,
a lug washer disposed against said cushion washer,
means including gasket retainer means retaining together as a subassembly said gasket, mica disc, glass disc, cushion washer and lug washer and substantially centering said sub-assembly in said enlarged bore,
lug means on said lug washer acting between said water column and said lug washer to prevent relative rotation therebetween,
a spring washer disposed to act against said lug washer,
a shoulder stop on said water column,
a threaded member having a central viewing aperture,
and single thread means acting between said threaded member and said water column and engaging said shoulder stop to compress said spring washer to compress said gasket and relatively seal said mica disc to said water column.

9. A water gauge comprising, in combination, a water column formed of welded together individual water column bodies,
said water column having a central bore,
a lateral bore extending to said central bore in each said body,
each water column body including, a lateral bore having an outwardly facing recessed internal shoulder,
a male thread at said lateral bore,
an external shoulder stop near the inner end of the thread,
a port cap nut having a female thread to engage said male thread and having a flat end surface adapted to be tightened against said external shoulder stop,
a central viewing aperture in the outer end wall of said port cap nut,
a gasket disposed adjacent said internal shoulder,
a transparent window disposed against said gasket,
spring means disposed between said transparent window and the inner surface of the outer end wall of said port cap nut,
and said cap nut in engaging said stop shoulder compressing said spring means to compress said gasket and effect a seal thereat to said water column body.

10. A water gauge comprising, in combination, a water column formed of welded together individual water column bodies,
said water column having a central bore,
a lateral bore extending to said central bore in each said body,
each water column body including, a lateral bore having an outwardly facing recessed internal planar shoulder,
a male thread at said lateral bore,
an external shoulder stop near the inner end of the thread,
a port cap nut having a female thread to engage said male thread and having a flat end surface adapted to be tightened against said external shoulder stop,
a central viewing aperture in the outer end wall of said port cap nut,
a gasket disposed adjacent said planar shoulder,
a mica disc disposed against said gasket,
a glass disc disposed against said mica disc,
a wavy washer disposed between said glass disc and the inner surface of the outer end wall of said port cap nut,
and said cap nut in engaging said stop shoulder compressing said wavy washer to compress said gasket and relatively seal said mica disc to said water column body.

11. A water gauge comprising, in combination, a water column having a central bore,
a lateral bore extending to said central bore,
said lateral bore having an outwardly facing recessed internal planar shoulder and an enlarged bore at the outer end thereof,
said water column at said lateral bore being externally threaded and provided with an external shoulder stop near the inner end of the threads,
a port cap nut having female threads to engage said external threads and having a flat end surface adapted to be tightened against said external shoulder stop,
a central viewing aperture in the outer end wall of said port cap nut,
a gasket disposed adjacent said planar shoulder,
a mica disc disposed against said gasket,
a glass disc disposed against said mica disc,
cushion washer means disposed against the outer face of said glass disc,
means retaining together as a sub-assembly said gasket, mica disc, glass disc and cushion washer means and substantially centering said sub-assembly in said enlarged bore,
lug means acting between said water column and said cushion washer means to prevent relative rotation therebetween,
a wavy washer disposed between said cushion washer means and the inner surface of the outer end wall of said port cap nut,
means retaining said wavy washer in said port cap nut,
and said cap nut in engaging said stop shoulder compressing said wavy washer to compress said gasket and relatively seal said mica disc to said water column.

12. A water gauge comprising, in combination, a water column having a central bore,
a lateral bore extending to said central bore,
said lateral bore having an outwardly facing recessed internal planar shoulder and an enlarged bore at the outer end thereof,
said water column at said lateral bore being externally threaded and provided with an external shoulder stop near the inner end of the thread,
a port cap nut having female threads to engage said external threads and having a flat end surface adapted to be tightened against said external shoulder stop,
a central viewing aperture in the outer end wall of said port cap nut,
a gasket disposed adjacent said planar shoulder,
a mica disc disposed against said gasket,
a glass disc disposed against said mica disc,
a cushion washer disposed against the outer face of said glass disc,
a lug washer disposed to act against the outer face of said cushion washer,
means retaining together as a sub-assembly said gasket, mica disc, glass disc, cushion washer and lug washer and substantially centering said sub-assembly in said enlarged bore,
said water column having a recess on the outer end face of said enlarged bore,
lug means on said lug washer received in said recess,
a wavy washer disposed between said lug washer and the inner surface of the outer end wall of said port cap nut,
means retaining said wavy washer in said port cap nut,
said cap nut in engaging said stop shoulder compressing said wavy washer to compress said gasket and relatively seal said mica disc to said water column.

13. A dual color water gauge comprising, in combination, a vertical water column having a vertical bore,
a lateral bore extending to said vertical bore,
said lateral bore having an outwardly facing recessed internal planar shoulder and an enlarged bore at the outer end thereof,
said water column at said lateral bore being externally threaded and provided with an external right angle shoulder stop near the inner end of the thread,
a port cap nut having female threads to engage said external threads and having a flat end surface adapted to be tightened against said external right angle shoulder stop,
a central viewing aperture in the outer end wall of said port cap nut,
a gasket retainer in said enlarged bore,
said gasket retainer being generally cup shaped of thin metal with the bottom of the cup being centrally apertured and adjacent said internal planar shoulder,
means on said gasket retainer centering same in said enlarged bore,
a gasket disposed adjacent said planar shoulder and retained at the outer periphery thereof in said central aperture of said gasket retainer,
a mica disc disposed against said gasket,
a Pyrex glass disc disposed against said mica disc,
means on said gasket retainer centering said Pyrex glass disc,
a cushion washer disposed against the outer face of said glass disc,
a lug washer disposed to act against the outer face of said cushion washer,
said water column having a recess on the outer end face of said enlarged bore,
lug means on said lug washer received in said recess,
a plurality of wavy washers disposed in parallel between said lug washer and the inner surface of the outer end wall of said port cap nut,
an annular recess in said cap nut at the base of said threads,
a wavy washer retainer having radial fingers engageable in said annular recess and retaining said wavy washers in said cap nut,
said cap nut in engaging said stop shoulder compressing said wavy washers to compress said gasket and relatively seal said mica disc to said planar shoulder of said water column,
and means to pass light through said glass disc, whereby water and steam in said lateral bore establish two different colors of light visible through said glass disc.

14. A dual color water gauge comprising, in combination, a vertical water column formed of welded together individual water column bodies,
said water column having a vertical bore,
first and second lateral bores extending to said vertical bore at an included angle of 160 degrees therebetween in each said body,
each of said lateral bores having an outwardly facing recessed internal planar shoulder and an enlarged bore at the outer end thereof,
said water column bodies at said lateral bores being externally threaded and provided with external right angle shoulder stops near the inner end of the threads,
port cap nuts each having female threads to engage said external threads and having a flat end surface adapted to be tightened against a respective external right angle shoulder stop,
a central viewing aperture in the outer end wall of each said port cap nut,
a gasket retainer in each said enlarged bore,
each said gasket retainer being generally cup shaped of thin metal with the bottom of the cup being centrally apertured and adjacent said internal planar shoulder,
means on each said gasket retainer centering same in said enlarged bore,
a gasket disposed adjacent each said planar shoulder and retained at the outer periphery thereof in said central aperture of the respective gasket retainer,
a mica disc disposed against each said gasket,
a Pyrex glass disc disposed against each said mica disc,
means on each said gasket retainer centering said Pyrex glass disc,
a cushion washer disposed against the outer face of each said glass disc,
a lug washer disposed to act against the outer face of each said cushion washer,
said water column bodies having a recess on the outer end face of each said enlarged bore,
lug means on each said lug washer received in said recess,
a wavy washer disposed between each said lug washer and the inner surface of the outer end wall of the respective port cap nut,
each said cap nut in engaging said stop shoulder compressing said wavy washer to compress said gasket and relatively seal said mica disc to the respective water column body,
and a light source horizontally shining through the two opposite port cap nuts and lateral bores with said light source being red and green horizontally adjacent light beams, whereby when said water column is full of water a green light is visible through said glass discs and when said water column is full of steam a red light is visible through said glass discs.

15. A dual color water gauge comprising, in combination, a vertical water column formed of welded together individual forged water column bodies,
said water column having a vertical bore,
first and second lateral bores in each body extending to said vertical bore at an included angle of 160 degrees therebetween in each said body,
each of said lateral bores having a small diameter bore adjacent said vertical bore and an enlarged bore at the outer end thereof and joined by a recessed internal planar shoulder,
said water column bodies at said lateral bores being externally threaded and provided with external right angle shoulder stops at the inner end of the threads,
port cap nuts each having female threads to engage said external threads and having a flat end surface adapted to be tightened against a respective external right angle shoulder stop,
a central viewing aperture in the outer end wall of each said port cap nut,
a shallow annular gasket groove in each said internal planar shoulder,
a gasket retainer in each said enlarged bore,
each said gasket retainer being generally cup shaped of thin metal with the bottom of the cup being centrally apertured and adjacent said internal planar shoulder,
three symmetrically spaced external dimples on each said gasket retainer centering same in the respective enlarged bore,
a Monel clad asbestos gasket disposed in each said annular gasket groove and centered and retained at the outer periphery thereof in said central aperture of the respective gasket retainer,
a mica disc disposed against each said gasket,
a Pyrex glass disc disposed against each said mica disc,
three symmetrically spaced internal dimples on each said gasket retainer centering said Pyrex glass disc,
a soft copper cushion washer disposed against the outer face of each said glass disc,
a lug washer disposed to act against the outer face of each said cushion washer,
said water column bodies having two axial recesses peripherally spaced on the outer end face of each said enlarged bore,
two lugs on each said lug washer received in said recesses to prevent turning of said lug washer,
three wavy washers disposed in parallel between each said lug washer and the inner surface of the outer end wall of the respective port cap nut,
an annular recess in each said cap nut at the base of said threads,
a wavy washer retainer having radial fingers engageable in each said annular recess and retaining said wavy washers in each said cap nut,
each said cap nut in engaging said stop shoulder compressing said wavy washers to compress said gasket and relatively seal said mica disc to the respective water column body,
and a light source horizontally shining through the two opposite port cap nuts and lateral bores with said light source being red and green horizontally adjacent light beams, whereby when said water column is full of water a green light is visible through said glass discs and when said water column is full of steam a red light is visible through said glass discs.

References Cited by the Examiner

UNITED STATES PATENTS

| | | | |
|---|---|---|---|
| 839,326 | 12/06 | Seabury | 73—331 |
| 937,276 | 10/09 | Ashley | 73—331 |
| 1,199,006 | 9/16 | Groff | 73—330 |
| 2,767,586 | 10/56 | Jancosek et al. | 73—329 |
| 3,013,433 | 12/61 | Miller et al. | 73—330 |

ISAAC LISANN, *Primary Examiner.*

ROBERT L. EVANS, *Examiner.*